(12) United States Patent
Masuda et al.

(10) Patent No.: US 12,538,054 B2
(45) Date of Patent: Jan. 27, 2026

(54) ELECTRONIC APPARATUS

(71) Applicant: SONY GROUP CORPORATION, Tokyo (JP)

(72) Inventors: Hideki Masuda, Tokyo (JP); Soichi Tanaka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 237 days.

(21) Appl. No.: 18/262,263

(22) PCT Filed: Dec. 9, 2021

(86) PCT No.: PCT/JP2021/045328
§ 371 (c)(1),
(2) Date: Jul. 20, 2023

(87) PCT Pub. No.: WO2022/163161
PCT Pub. Date: Aug. 4, 2022

(65) Prior Publication Data
US 2024/0137676 A1  Apr. 25, 2024
US 2024/0236533 A9  Jul. 11, 2024

(30) Foreign Application Priority Data
Jan. 28, 2021  (JP) .................. 2021-012302

(51) Int. Cl.
*H04R 1/02* (2006.01)
*H05K 5/02* (2006.01)

(52) U.S. Cl.
CPC ............. *H04R 1/02* (2013.01); *H05K 5/0217* (2013.01)

(58) Field of Classification Search
CPC .................. H04R 1/02; H05K 5/0217
See application file for complete search history.

(56) References Cited

U.S. PATENT DOCUMENTS 3,113,651 A  * 12/1963  Szabo ................ A45C 13/22
16/405
6,032,334 A  *  3/2000  Iima .................. A45C 13/26
16/444

(Continued)

FOREIGN PATENT DOCUMENTS

JP    59-125873 U    8/1984
JP    64-011581 U    1/1989

(Continued)

OTHER PUBLICATIONS

International Search Report and Written Opinion of PCT Application No. PCT/JP2021/045328, issued on Mar. 8, 2022, 09 pages of ISRWO.

*Primary Examiner* — Oyesola C Ojo
(74) *Attorney, Agent, or Firm* — CHIP LAW GROUP (57) ABSTRACT

Provided is an electronic apparatus that includes an elastic member that assumes a first shape with which the elastic member is fitted in a housing, and a supporting portion that is provided on the housing and supports opposite end portions of the elastic member. The supporting portion supports one end portion of the opposite end portions for pivotal motion in a direction in which a portion between the opposite end portions moves toward and away from the housing, and supports another end portion of the opposite end portions for sliding movement between a first position in which the elastic member assumes the first shape and a second position that is positioned on the one end portion side with respect to the first position and in which the elastic member is elastically deformed to a second shape with which the portion between the opposite end portions protrudes from the housing.

10 Claims, 7 Drawing Sheets

(56) References Cited

U.S. PATENT DOCUMENTS

| | | | | |
|---|---|---|---|---|
| 8,453,297 | B2* | 6/2013 | Wang | G06F 1/1656 |
| | | | | 190/115 |
| 8,939,483 | B2* | 1/2015 | Kim | A45C 11/00 |
| | | | | 224/217 |
| 8,950,638 | B2* | 2/2015 | Wangercyn, Jr. | H04B 1/385 |
| | | | | 224/217 |
| 9,793,941 | B1* | 10/2017 | Hirsch | G06F 1/1656 |
| 10,455,927 | B2* | 10/2019 | Brousseau | B25G 3/00 |
| 11,294,425 | B2* | 4/2022 | Hsu | G06F 1/1616 |
| 11,452,365 | B2* | 9/2022 | Vasquez | A45F 5/10 |
| 11,880,236 | B2* | 1/2024 | Hsu | H05K 5/023 |
| 2002/0116277 | A1* | 8/2002 | Kraft | G11B 27/105 |
| | | | | 705/26.8 |
| 2015/0365125 | A1* | 12/2015 | Murphy | A45F 5/00 |
| | | | | 455/575.6 |
| 2022/0400841 | A1* | 12/2022 | Vasquez | A45F 5/00 |
| 2025/0155068 | A1* | 5/2025 | Wang | F16L 55/07 |

FOREIGN PATENT DOCUMENTS

| | | | | | |
|---|---|---|---|---|---|
| JP | | 05-090767 A | | 4/1993 | |
| JP | | H05090767 A | * | 4/1993 | ............... H05K 5/02 |
| JP | | 06-017709 A | | 1/1994 | |
| JP | | 10-335843 A | | 12/1998 | |

* cited by examiner

ELECTRONIC APPARATUS

CROSS REFERENCE TO RELATED APPLICATIONS

This application is a U.S. National Phase of International Patent Application No. PCT/JP2021/045328 filed on Dec. 9, 2021, which claims priority benefit of Japanese Patent Application No. JP 2021-012302 filed in the Japan Patent Office on Jan. 28, 2021. Each of the above-referenced applications is hereby incorporated herein by reference in its entirety.

TECHNICAL FIELD

The present disclosure relates to an electronic apparatus.

BACKGROUND ART

Conventionally, a handle of an electronic apparatus such as a speaker device is mounted in a visible shape on a housing. Incidentally, as a handle for a bottle, a foldable handle is disclosed in PTL 1 specified below. Formation of a handle as a foldable handle makes it easy to handle an electronic apparatus upon transportation and so forth and makes it possible to sell it through a vending machine.

CITATION LIST

Patent Literature

[PTL 1]
  Japanese Laid-Open Utility Model Publication No. Hei 6-17709

SUMMARY

Technical Problem

Here, improvement of the designability is required for an electronic apparatus. For example, by adopting the handle disclosed in PTL 1 in an electronic apparatus, it is possible to achieve differentiation in shape of the handle when it is used and when it is not used. However, the handle disclosed in PTL 1 spoils the beauty in that, in its folded state, a bent plate portion having a channel-shaped cross section protrudes to the outside.

It is one of objects of the present disclosure to propose an electronic apparatus capable of improving the designability.

Solution to Problem

The present disclosure is, for example, an electronic apparatus including an elastic member that assumes a first shape with which the elastic member is fitted in a housing, and a supporting portion that is provided on the housing and supports opposite end portions of the elastic member. The supporting portion supports one end portion of the opposite end portions for pivotal motion in a direction in which a portion between the opposite end portions moves toward and away from the housing, and supports another end portion of the opposite end portions for sliding movement between a first position in which the elastic member assumes the first shape and a second position that is positioned on the one end portion side with respect to the first position and in which the elastic member is elastically deformed to a second shape with which the portion between the opposite end portions protrudes from the housing.

The present disclosure is, for example, an electronic apparatus including an elastic member that assumes a first shape with which the elastic member is fitted in a housing, and a supporting portion that is provided on the housing and supports opposite end portions of the elastic member. The supporting portion supports each of the opposite end portions for sliding movement between a first position in which the elastic member assumes the first shape and a second position in which the opposite end portions are closer to each other than those in the first position and in which the elastic member is elastically deformed in a second shape with which a portion between the opposite end portions protrudes from the housing. The elastic member includes a first magnetic substance between the opposite end portions. The supporting portion has a second magnetic substance that attracts the first magnetic substance to the housing side by magnetic force.

DESCRIPTION OF EMBODIMENT

In the following, an embodiment and so forth of the present disclosure are described with reference to the drawings. It is to be noted that the embodiment and so forth described below are specific preferred examples of the present disclosure, and the details of the present disclosure are not restricted to the embodiment and so forth. Further, in the following description, in order to prevent complicated illustration, reference signs are applied only to some components in some cases, or some components are depicted in a simplified form in some cases. The description is given in the following order.

<1. Embodiment>
<2. Modification>

1. Embodiment

Example of Configuration of Electronic Apparatus

In the following, the embodiment of the present disclosure is described in detail. It is to be noted that, in the following description, upward, downward, leftward, rightward, forward, and rearward directions are representations for the convenience of description, and the present disclosure is not applied restrictively in regard to the directions.

Figure 1:
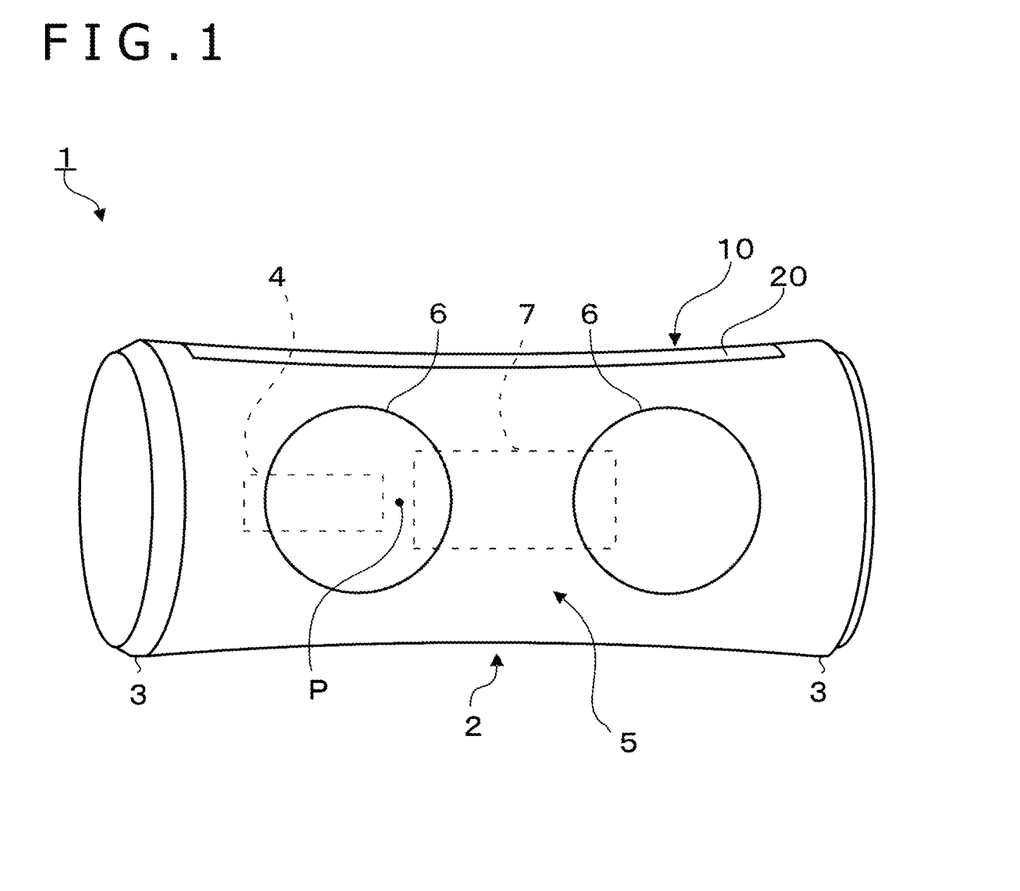
FIG. 1 is a view depicting an example of a configuration of a speaker device according to an embodiment.

FIG. 1 depicts an example of a configuration of an electronic apparatus (speaker device 1) according to the embodiment of the present disclosure. In particular, the speaker device 1 is an active speaker (more particularly, an active speaker for domestic use). The speaker device 1 has a housing (main body) 2 of a substantially cylindrical shape extending in a leftward and rightward direction as depicted in FIG. 1. The housing 2 has, for example, on the lower side (bottom side) thereof, placement portions 3 which are able to be placed on a placement place, as depicted in FIG. 1. The placement portions 3 are formed, for example, in a planar shape such that the speaker device 1 can be placed without rolling, when the placement portions 3 are placed on the placement place.

The speaker device 1 includes a battery 4 and a part 5 driven by the battery 4. The battery 4 is provided at a position offset to one side (in the example depicted, to the left side) in a cylinder axial direction (leftward and rightward direction) of the housing 2. The battery 4, which is a heavy load, offsets a gravity center position P of the speaker device 1 to the left side similarly to the battery 4.

The speaker device 1 includes, as the part 5, for example, speaker units 6 that output vibration (including sound) and a driving section 7 that drives an amplifier, an electronic circuit, and so forth for driving the speaker units 6. As depicted in FIG. 1, the speaker units 6 are attached, for example, to the housing 2, and the driving section 7 is provided, for example, in the housing 2.

A handle device 10 is provided on the upper side of the housing 2 (on the side opposite to the side on which the placement portions 3 is provided). The handle device 10 has, on the upper side thereof, an elastic member 20 that functions as a handle. In short, the elastic member 20 is provided on the upper side of the housing 2. This facilitates a handle operation. In other words, the elastic member 20 makes it possible to easily perform carrying of the handle device 10.

Figure 2:
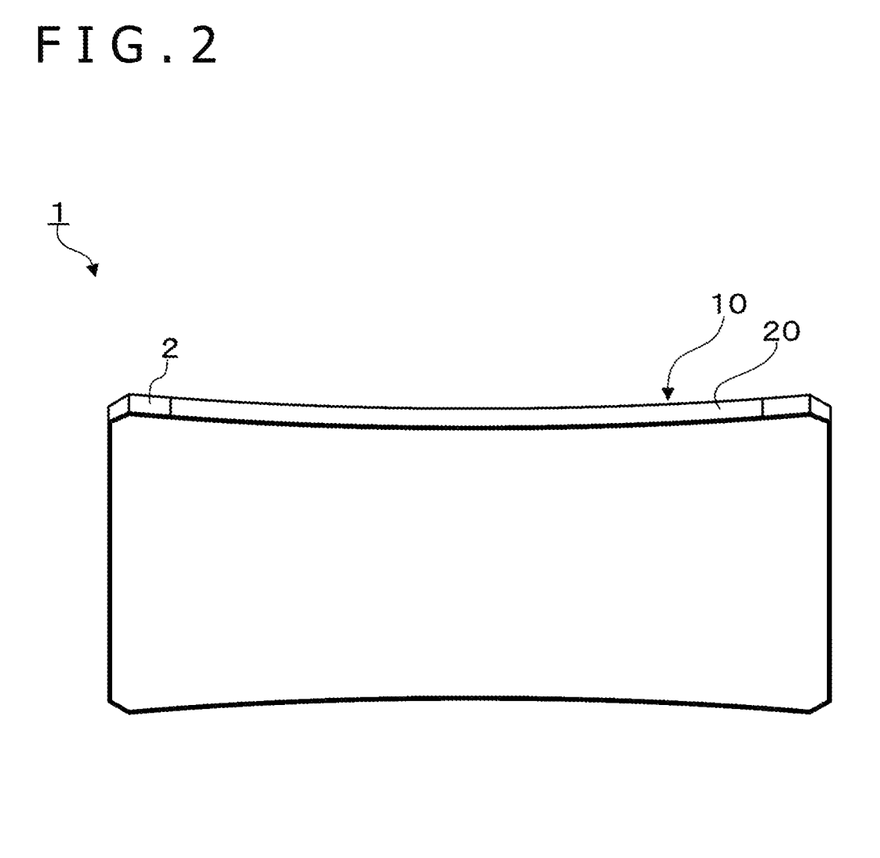
FIG. 2 is a view schematically depicting an example of a configuration of the speaker device when a handle is fitted.
Figure 3:
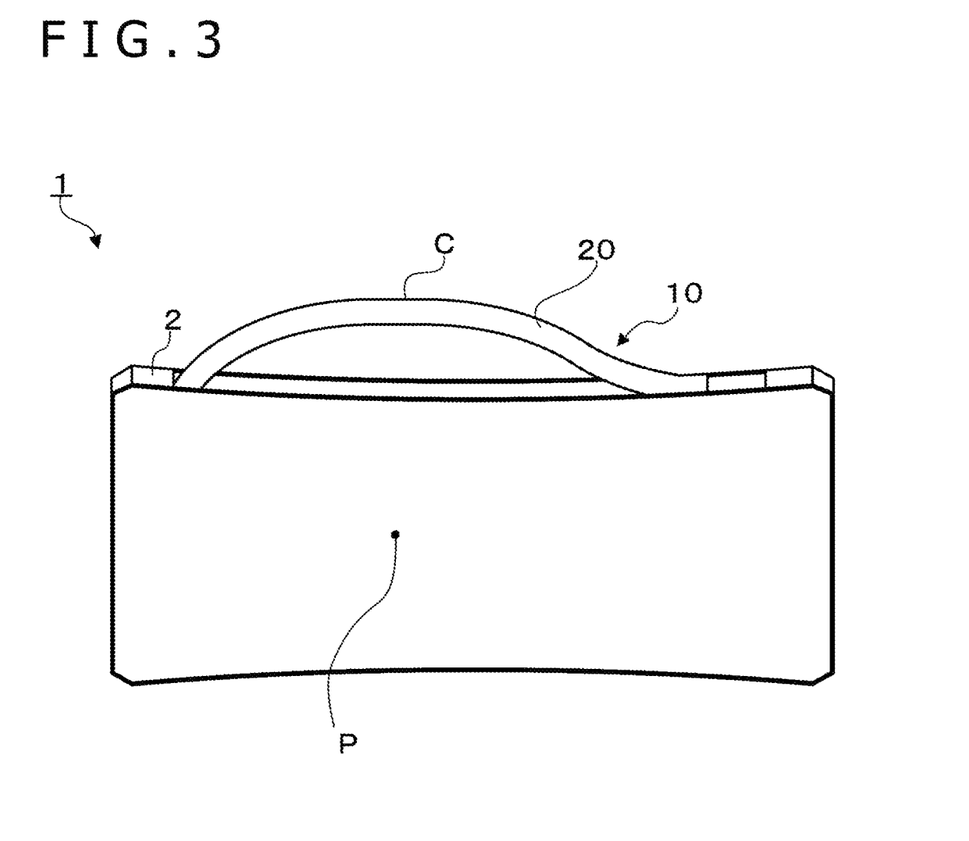
FIG. 3 is a view depicting an example of a configuration of the speaker device when the handle is used.

FIGS. 2 and 3 are views schematically depicting an example of a configuration of the speaker device 1 when the handle is fitted and when the handle is used, respectively. When the handle is fitted, the speaker device 1 assumes a first shape with which the elastic member 20 is fitted in the housing 2 as depicted in FIG. 1 and FIG. 2. As depicted in FIGS. 1 and 2, for example, in the first shape, the elastic member 20 forms an appearance face that is in flush with the outer face of the housing 2. The term "flush" here is used to include not only a fully flush state but also a substantially flush state that has a very small step (for example, a step of within 5 mm). It is to be noted that, although the present embodiment is described assuming that the elastic member 20 assumes the first shape in a state in which the elastic member 20 is not in an elastically deformed state, the elastic member 20 may otherwise assume the first shape in its elastically deformed state (particularly, in a state deformed by lower force than that in a second shape hereinafter described).

On the other hand, as depicted in FIG. 3, in the speaker device 1, when the handle is used, the elastic member 20 is elastically deformed into the second shape with which a portion of the elastic member 20 between opposite end portions (between a left side end portion and a right side end portion in FIG. 3) protrudes from the housing 2. Consequently, for example, when the handle is to be used, a gap into which fingers (for example, two or more fingers) can be inserted is formed between the elastic member 20 and the housing 2, and this makes it possible to use the elastic member 20 as a handle.

As depicted in FIG. 3, for example, in the second shape, the elastic member 20 protrudes (is curved) in an arch from the housing 2 toward the upper side such that a central portion C of the arched protrusion is formed on the gravity center position P side described hereinabove in an opposite end portion direction (leftward and rightward direction) of the elastic member 20. Such a configuration that the central portion C of the protrusion of the elastic member 20 is adjusted to the gravity center position P makes it easy to hold the speaker device 1 when the elastic member 20 is grasped to hold the speaker device 1. Further, the configuration that the elastic member 20 protrudes in an arch makes it possible to form a great gap between the elastic member 20 and the housing 2 to thereby facilitate grasping of the elastic member 20. In the following, an example of a configuration of the handle device 10 is described in detail.

Example of Configuration of Handle Device

Figure 4:
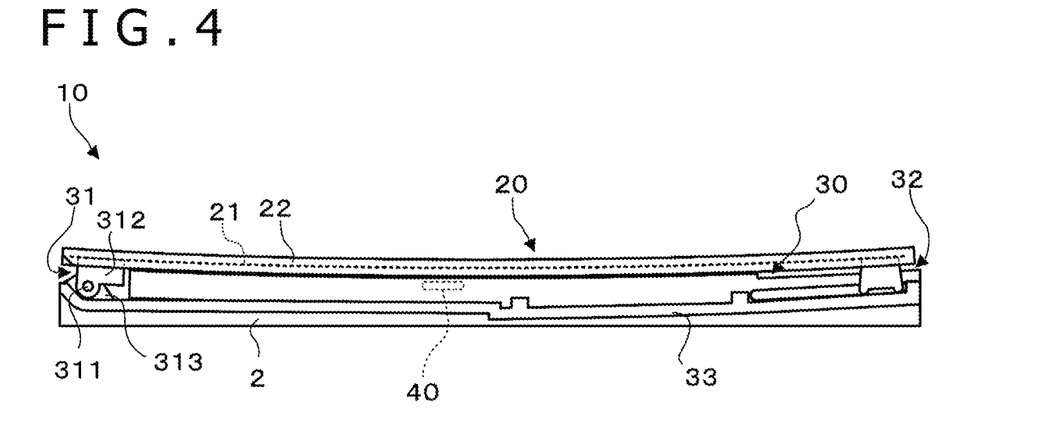
FIG. 4 is a view depicting an example of a configuration of a handle device when the handle is fitted.
Figure 5:
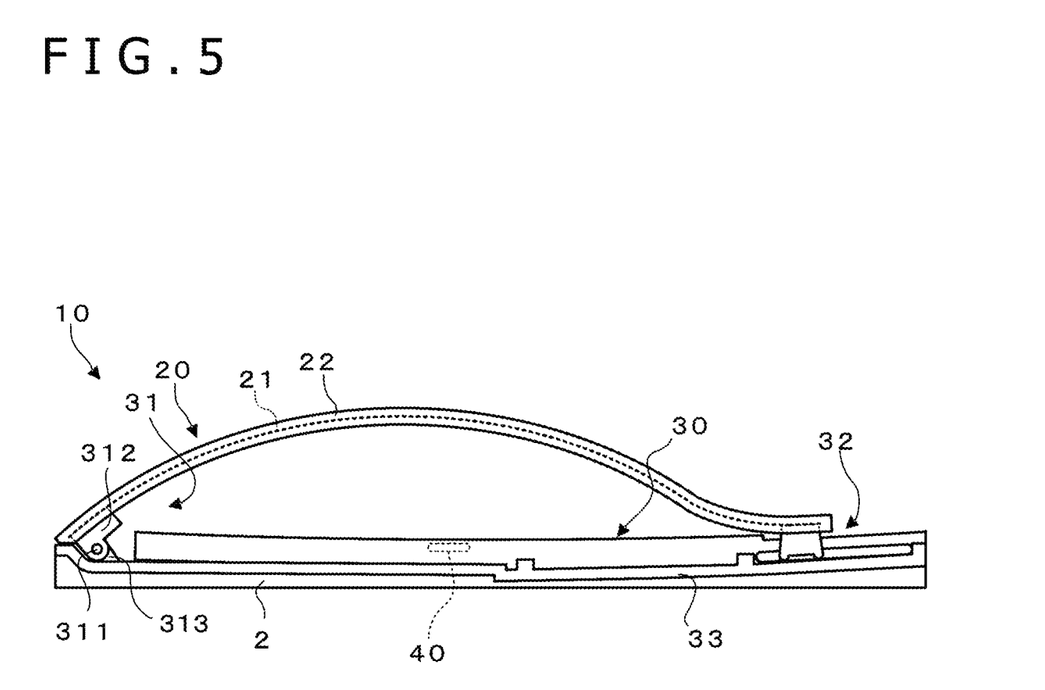
FIG. 5 is a view depicting an example of a configuration of the handle device when the handle is used.

FIGS. 4 and 5 depict an example of a configuration of the handle device 10 when the handle is fitted and when the handle is used, respectively. The handle device 10 includes, for example, in addition to the elastic member 20 described hereinabove, a supporting portion 30 that supports the elastic member 20 and an attracting portion 40 that attracts the elastic member 20 thereto.

Example of Configuration of Elastic Member

The elastic member 20 is configured, for example, in a bar-like shape. In particular, the elastic member 20 is configured in a shape of a substantially flat plate. The substantially flat plate shape here includes not only a shape of a fully flat plate shape but also a shape curved slightly. Further, the elastic member 20 has flexibility as depicted in FIG. 5.

In particular, the elastic member 20 includes a leaf spring material 21 and has flexibility by the leaf spring material 21. The leaf spring material 21 is configured, for example, in a shape of a substantially flat plate similarly to the elastic member 20. The leaf spring material 21 includes a magnetic substance (first magnetic substance) such as, for example, SUS631. It is to be noted that the leaf spring material 21 is not limited to this and may be formed from some other metal such as, for example, stainless steel, carbon steel, carbon tool steel, or phosphor bronze. Further, the leaf spring material 21 is not limited to that made of metal and may be formed from a nonmetal material such as a resin material (for example, polycarbonate, polypropylene, or the like) or ceramic. In such a manner, the material of the leaf spring material 21 is not limited to a specific one.

The elastic member 20 is configured, for example, at a surface portion 22 thereof from a flexible material such as elastomer and has flexibility. In particular, the surface portion 22 of the elastic member 20 is formed by coating the leaf spring material 21 with a flexible material. It is to be noted that the material of the surface portion 22 is not limited to elastomer and that the surface portion 22 may include a flexible material such as rubber such as silicone rubber, fabric, or other belt materials. In such a manner, the material of the surface portion 22 is not limited to a specific one, as in the case of the leaf spring material 21.

Example of Configuration of Supporting Portion

The supporting portion 30 is provided on the housing 2 and supports the opposite end portions of the elastic member 20. In particular, the supporting portion 30 supports opposite end portions of the leaf spring material 21. The supporting portion 30 has, for example, a first supporting portion 31, a second supporting portion 32, and a connection portion 33.

The first supporting portion 31 supports one of the opposite end portions (left side end portion) of the elastic member 20 for pivotal motion in a direction in which the opposite end portions of the elastic member 20 move toward and away from each other from the housing 2. In other words, the first supporting portion 31 supports the one end portion of the elastic member 20 for pivotal motion in a direction in which the elastic member 20 is fitted in the housing 2 and another direction in which the elastic member 20 protrudes from the housing. The first supporting portion 31 allows rotation of the one end portion of the elastic member 20, for example, according to a deformation state of the elastic member 20.

In the example depicted, the first supporting portion 31 includes a rotation axis member 311 as a pivot shaft extending in a forward and rearward direction (in the forward and rearward direction in a case where the near side in the figure is the front side and the remote side is the rear side), a first connection member 312 that is fixed to the one end portion of the elastic member 20 and that supports the opposite ends of the rotation axis member 311, and a second connection member 313 fixed to the connection portion 33 and attached for pivotal motion to the rotation axis member 311. Consequently, the elastic member 20 is configured such that the one end portion thereof pivots in response to a deformation state of the elastic member 20. It is to be noted that the structure of the first supporting portion 31 is not limited to the depicted one. For example, some other known rotation structure may be adopted for the first supporting portion 31.

The second supporting portion 32 supports the other end portion (right side end portion) of the opposite end portions of the elastic member 20 for sliding movement between a first position in which the elastic member 20 assumes the first shape and a second position that is positioned on the one end portion side with respect to the first position and in which the elastic member 20 is elastically deformed to the second shape. The second supporting portion 32 allows, for example, the other end portion of the elastic member 20 to slidably move along an outer face of the housing 2. It is to be noted that it is only necessary for the second supporting portion 32 to be shaped in such a manner as to slidably move in a direction in which the opposite end portions of the elastic member 20 move toward and away from each other, and may be configured, for example, in such a manner as to slide linearly along the curved outer face of the housing 2.

Figure 6:
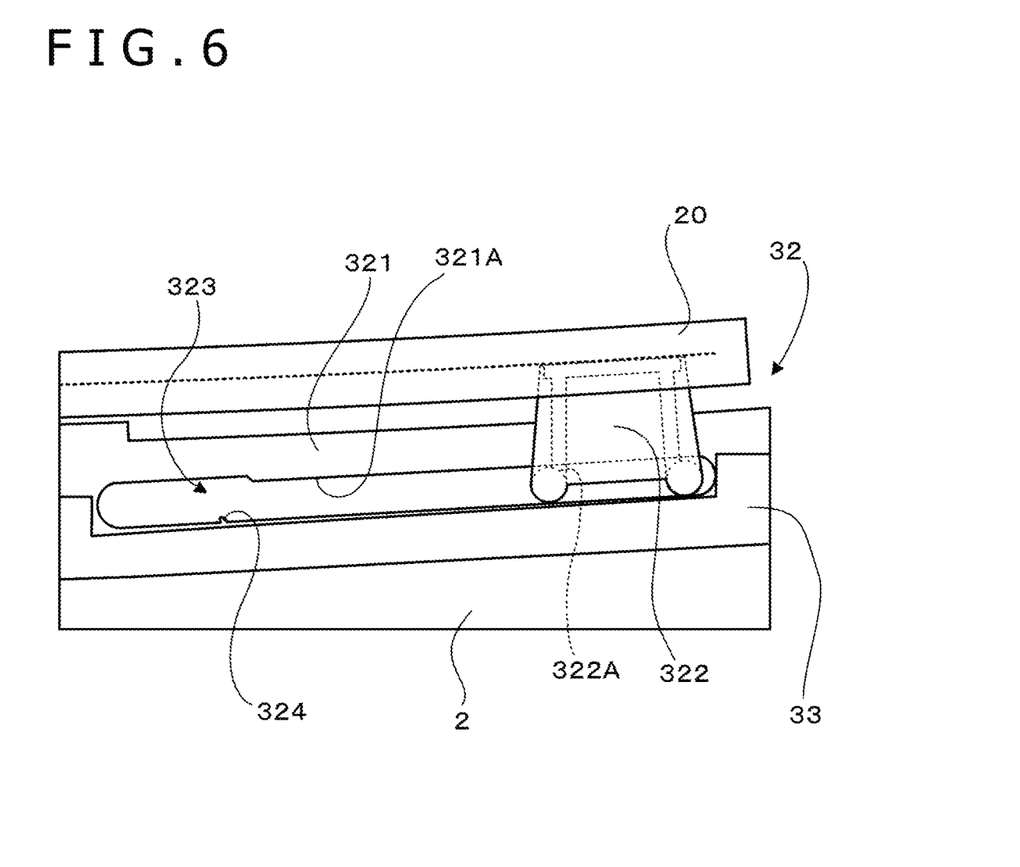
FIG. 6 is a view depicting an example of a configuration of a second supporting portion when the handle is fitted.
Figure 7:
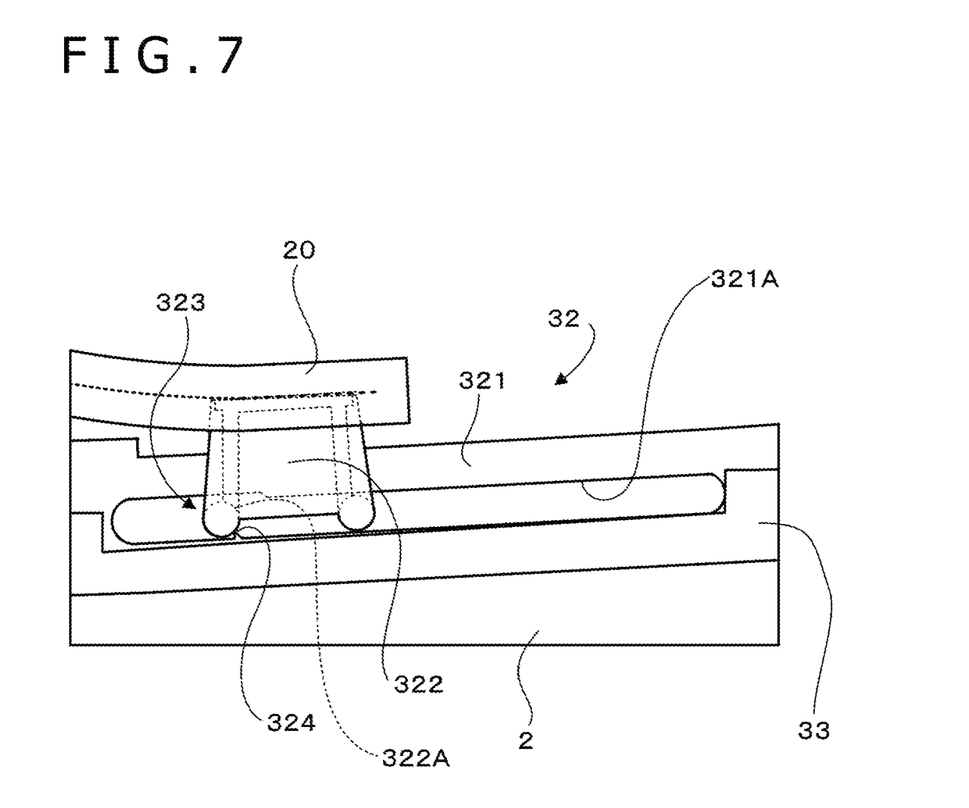
FIG. 7 is a view depicting an example of a configuration of the second supporting portion when the handle is used.

FIGS. 6 and 7 depict an example of a configuration of the second supporting portion 32 when the handle is fitted and when the handle is used, respectively. In the example depicted, the second supporting portion 32 includes a guide member 321 fixed to the connection portion 33 and a slide portion 322 fixed to the other end portion of the elastic member 20, and is configured to be slidable. The guide member 321 has a rail portion 321A, for example, along the outer face of the housing 2 as depicted in FIGS. 6 and 7. The slide portion 322 has a fitting portion 322A that fits for sliding movement with the rail portion 321A. Consequently, the elastic member 20 is configured such that the other end portion thereof is slidable along the outer face of the housing 2.

Here, the second supporting portion 32 has a holding portion 323 that holds the other end portion of the elastic member 20 in the second position. The holding portion 323 is configured such that the other end portion of the elastic member 20 in the second position does not move to the first position side by the restoring force of the elastic member 20, as depicted in FIG. 7. In the example depicted, the holding portion 323 is configured by providing, on the rail portion 321A, a protrusion 324 that suppresses a movement of the fitting portion 322A.

Figure 8:
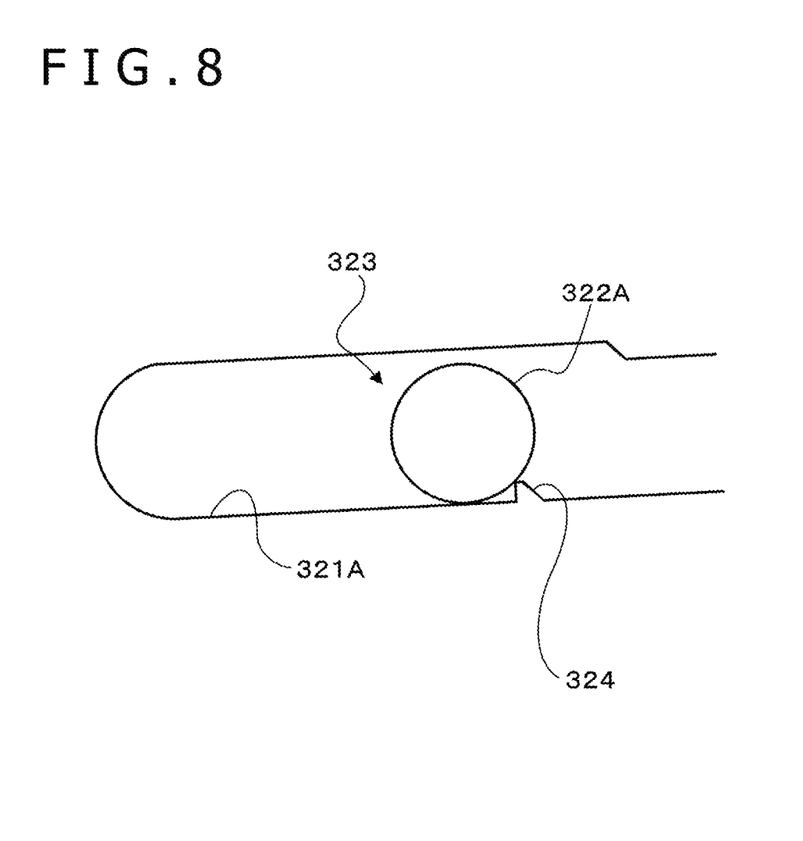
FIG. 8 is a view depicting an example of a configuration of a holding portion for holding a second position.

The protrusion 324 has, for example, a moderate inclined face on the first position side thereof and has a step-like shape on the second position side thereof, as depicted in an enlarged view of FIG. 8. This makes it possible to allow the other end portion of the elastic member 20 to smoothly move from the first position to the second position. It is to be noted that the structure of the holding portion 323 is not limited to this. For example, another holding portion similar to the holding portion 323 may be formed additionally between the first position and the second position such that a structure that can elastically deform the elastic member 20 stepwise is formed. Further, as the holding portion 323, some other known holding structure may be adopted.

Here, referring back to FIGS. 4 and 5, the connection portion 33 is provided in order to connect the first supporting portion 31 and the second supporting portion 32 to the housing 2. The connection portion 33 may be fixedly mounted on the housing 2 or may be removably attached to the housing 2. Alternatively, the connection portion 33 may be configured integrally with the housing 2. In a case where the connection portion 33 is configured in such a manner as to be removably mounted, the handle device 10 can easily be exchanged.

Example of Configuration of Attracting Portion

The attracting portion 40 is provided to attract the elastic member 20 to the housing 2 side. In particular, the attracting portion 40 includes a magnetic substance (second magnetic substance) such as a permanent magnet. The attracting portion 40 is provided, for example, at a position corresponding to a portion between the opposite end portions of the elastic member 20 of the first shape on the housing 2 side and, is configured such that a magnetic substance (first magnetic substance), in particular, the leaf spring material 21, of the elastic member 20 is attracted to the housing 2 side by magnetic force. Here, in a case where the leaf spring material 21 is not a magnetic substance, it is sufficient if there is used a configuration in which the magnetic substance (first magnetic substance) is separately provided between the opposite end portions of the elastic member 20 in such a manner as to attract the magnetic substance (second magnetic substance) provided on the housing 2 side. It is to be noted that the number, position, and so forth of such magnetic substances are not limited to those depicted in the figures.

Example of Use of Handle Device (Action)

For example, when the handle is fitted, the other end portion of the elastic member 20 is placed in the first position in which the elastic member 20 assumes the first shape as depicted in FIGS. 4 and 6. By this, the elastic member 20 is placed into a state in which it is fitted in the housing 2 side (fitted state), as depicted in FIGS. 1 and 2.

On the other hand, when the handle is to be used, the other end portion of the elastic member 20 is moved from the first position to the one end portion side, for example, by a hand, as depicted in FIGS. 5 and 7. By this, the first supporting portion 31 is rotated to elastically deform the elastic member 20 and is placed into a state (use state) in which the elastic member 20 protrudes from the housing 2 and can be used as a handle, as depicted in FIGS. 3 and 5.

It is to be noted that, in a case where the elastic member 20 is placed from the use state into the fitted state, it is sufficient if the protruding portion of the elastic member 20 is pushed to the housing 2 side, for example, by a hand to cancel the holding by the holding portion 323 (refer to FIGS. 7 and 8). In particular, the protruding portion of the elastic member 20 is pushed such that the fitting portion 322A rides over the protrusion 324. By this, the elastic member 20 can easily be returned to the first position without stopping midway, by the restoring force of the elastic member 20, and the elastic member 20 can be placed into the first shape.

Advantageous Effect by Embodiment

As described above, in the speaker device 1, when the handle is to be used, it is possible to place the elastic member 20 into the first shape to place the elastic member 20 into a state in which it is fitted in the housing 2. This makes it possible to place the handle shape into a less outstanding state (particularly, into an invisible state), and the designability can be improved. On the other hand, when the handle is to be used, the elastic member 20 is placed into the second shape to allow the handle shape to be taken out to be used as a handle. In such a manner, from the point of view of the product design, the differentiation when the handle is used and when the handle is not used can be implemented.

Here, in the speaker device 1, the handle shape can be formed only by sliding the other end portion of the elastic member 20. This makes a different structure for drawing out the elastic member 20 unnecessary. Consequently, an appearance face that is in flush with the outer face of the housing 2 can be formed on the elastic member 20, and the designability can be improved. Further, a handle that can be fitted can be implemented with a simple configuration.

Further, the leaf spring material 21 is used as a component of the elastic member 20 that functions as a handle. By this, the handle device 10 can achieve both the strength and the thinness (good space efficiency).

Further, by installing a magnetic substance (second magnetic substance) that attracts the magnetic substance (first magnetic substance) of the elastic member 20 on the housing 2 side, it is possible to mutually attract and fix the elastic member 20 to and on the housing 2 side. Consequently, it is possible to implement the easiness when the handle is to be fitted (it is possible to place the handle, by one push, into a state in which the magnetic substance is attracted to the housing 2 by the magnetic force utilized) and high quality (reduction of fluttering when, for example, music is reproduced).

2. Modification

Although the embodiment of the present disclosure has been described particularly, the present disclosure is not limited to the embodiment described above, and various modifications based on the technical idea of the present disclosure are possible. For example, such various modifications as described below are possible. Also, it is possible to suitably combine a freely-selected one or a plurality of ones of the modes of the modifications described below. Further, the configurations, methods, steps, shapes, materials, numerical values, and so forth of the embodiment described above can be combined with each other without departing from the subject matter of the present disclosure. Also, it is possible to divide one thing into two or more things. Also, it is possible to omit some parts.

For example, the configuration of the speaker device 1 is not limited to that described above. For example, the number, type, position, and so forth of such speaker units 6 can freely be determined. Further, the configuration of the housing 2 is not limited to that of a substantially cylindrical shape (including a fully cylindrical shape) and may be that of a different shape such as a substantially rectangular parallelepiped (including a fully rectangular parallelepiped), and the gravity center position P of the speaker device 1 may be different from the position described hereinabove. Moreover, the position and orientation at and in which the handle device 10 is provided are not limited to those described above and can be determined suitably depending upon the shape of the housing, the position at which the handle device 10 is placed on the placement place, the position of the center of gravity of the speaker device, and so forth. Further, the speaker device 1 is not limited to an active speaker and may be a passive speaker.

In addition, for example, the configuration of the handle device 10 is not limited to that described above. For example, although, in the handle device 10 described above, the one end portion of the elastic member 20 is supported for pivotal motion and the other end portion is supported for sliding movement, the opposite end portions of the elastic member 20 may individually be supported for sliding movement. In other words, the supporting portion 30 described above may support each of the opposite end portions of the elastic member 20 for sliding movement between the first position in which the elastic member 20 assumes the first shape and the second position in which the opposite end portions of the elastic member 20 are positioned closer to each other than those in the first position and the elastic member 20 is elastically deformed into the second shape. In this case, the necessity to worry about, for example, which one of the end portions is to be moved is eliminated, and the convenience can be improved thereby. Further, in this case, the elastic member 20 may be configured such that the position of a central portion of the protrusion of the elastic member 20 in the second shape can be adjusted in the opposite end portion direction.

Further, for example, the configuration of the elastic member 20 is not limited to that described hereinabove. For example, although it has been described that, in a case where the other end portion of the elastic member 20 is in the first position, the elastic member 20 assumes the first shape with which it forms an appearance face that is in flush with the outer face of the housing 2 and is fitted, the first shape assumed by the elastic member 20 may be a shape with which the elastic member 20 is not fully fitted in the housing 2. Also in this case, the function as a movable handle described above is obtained.

Further, the shape of the elastic member 20 and the leaf spring material 21 may be a shape having a bent portion between the opposite end portions or a like shape. Further, the configuration of the elastic member 20 is not limited to the leaf spring material 21 of a planar shape, and the elastic member 20 may include a linear spring material or may include a plurality of spring materials in combination. Further, the elastic member 20 may include only a spring material or materials such as the leaf spring material 21 with the surface portion 22 omitted. In short, the spring material itself may be used as the elastic member. Alto in those cases, advantageous effects similar to those described above can be obtained.

Further, for example, the magnetic substance (first magnetic substance) between the opposite end portions of the elastic member 20 described above and the attracting portion 40, that is, the magnetic substance (second magnetic substance) on the housing 2 side, may be omitted. Since the magnetic substances are members for easiness in fitting and high quality as described hereinabove, even if they are not used, they can achieve the advantageous effects as a movable handle.

Further, although the embodiment described hereinabove exemplifies the speaker device, as an electronic apparatus, the electronic apparatus is not limited to this, and the present disclosure can be applied to other electronic apparatuses that include a speaker unit such as a tablet, a game machine, and a television device, for example. Further, the present disclosure may otherwise be applied to electronic apparatuses that do not include a speaker unit, such as a display and a camera. The present disclosure can be applied to all electronic apparatuses in which a handle is provided. Moreover, it is also possible to apply the present disclosure to a handle device of a bottle, a can, or a bag other than an electronic apparatus.

It is to be noted that the present disclosure can also adopt the following configurations.

(1)
An electronic apparatus including:
an elastic member that assumes a first shape with which the elastic member is fitted in a housing; and
a supporting portion that is provided on the housing and supports opposite end portions of the elastic member, in which
the supporting portion supports one end portion of the opposite end portions for pivotal motion in a direction in which a portion between the opposite end portions moves toward and away from the housing, and supports another end portion of the opposite end portions for sliding movement between a first position in which the elastic member assumes the first shape and a second position that is positioned on the one end portion side with respect to the first position and in which the elastic member is elastically deformed to a second shape with which the portion between the opposite end portions protrudes from the housing.

(2)
The electronic apparatus according to (1), in which
the elastic member includes a first magnetic substance between the opposite end portions, and
the supporting portion has a second magnetic substance that attracts the first magnetic substance to the housing side by magnetic force.

(3)
The electronic apparatus according to (2), in which
the elastic member has a leaf spring material serving as the first magnetic substance and has elasticity by the leaf spring material, and
the supporting portion supports opposite end portions of the leaf spring material.

(4)
The electronic apparatus according to any one of (1) to (3), including:
a speaker unit; and
a driving section that drives the speaker unit.

(5)
The electronic apparatus according to any one of (1) to (4), in which
the elastic member has an appearance face that is in flush with an outer face of the housing in a case where the other end portion is in the first position.

(6)
The electronic apparatus according to any one of (1) to (5), in which
a central portion of the protrusion of the elastic member is formed on a gravity center position side of the electronic apparatus in an opposite end portion direction in a case where the other end portion is in the second position.

(7)
The electronic apparatus according to (6), including:
a battery that offsets the gravity center position in the opposite end portion direction; and
a part that is driven by the battery.

(8)
The electronic apparatus according to any one of (1) to (7), in which
the housing has a placement portion that is able to be placed on a placement place, and
the elastic member is provided on a side opposite to the placement portion.

(9)
The electronic apparatus according to any one of (1) to (8), in which
the elastic member is configured at a surface portion thereof from a flexible material.

(10)
The electronic apparatus according to any one of (1) to (9), in which
the supporting portion has a holding portion that holds the other end portion at the second position.

(11)
An electronic apparatus including:
an elastic member that assumes a first shape with which the elastic member is fitted in a housing; and
a supporting portion that is provided on the housing and supports opposite end portions of the elastic member, in which
the supporting portion supports each of the opposite end portions for sliding movement between a first position in which the elastic member assumes the first shape and a second position in which the opposite end portions are closer to each other than those in the first position and in which the elastic member is elastically deformed in a second shape with which a portion between the opposite end portions protrudes from the housing,
the elastic member includes a first magnetic substance between the opposite end portions, and
the supporting portion has a second magnetic substance that attracts the first magnetic substance to the housing side by magnetic force.

REFERENCE SIGNS LIST

1: Speaker device
2: Housing
4: Battery
10: Handle device
20: Elastic member
21: Leaf spring material
22: Surface portion
30: Supporting portion
31: First supporting portion
32: Second supporting portion
40: Attracting portion
323: Holding portion

The invention claimed is:

1. An electronic apparatus, comprising:
a housing;
an elastic member, wherein
the elastic member is configured to be in a first shape, and
the elastic member is fitted in the housing with the first shape; and
a supporting portion on the housing, wherein
the supporting portion supports opposite end portions of the elastic member,
the supporting portion supports a first end portion of the opposite end portions of the elastic member for a pivotal motion,
the pivotal motion is in a direction in which a specific portion of the elastic member is movable toward and away from the housing,
the specific portion of the elastic member is between the opposite end portions of the elastic member,
the supporting portion supports a second end portion of the opposite end portions of the elastic member for a sliding movement between a first position and a second position,
the elastic member has the first shape in the first position,
the second position on a side of the first end portion with respect to the first position,
the elastic member is elastically deformable to a second shape in the second position,
in the second shape, the specific portion of the elastic member protrudes from the housing,
the elastic member includes a first magnetic substance between the opposite end portions of the elastic member,
the supporting portion includes a second magnetic substance, and
the second magnetic substance is configured to attract the first magnetic substance to a side of the housing by a magnetic force.

2. The electronic apparatus according to claim 1, wherein
the elastic member has a leaf spring material,
the leaf spring material serves as the first magnetic substance,
the elastic member has elasticity based on the leaf spring material, and
the supporting portion supports opposite end portions of the leaf spring material.

3. The electronic apparatus according to claim 1, further comprising:
a speaker unit; and
a driving section configured to drive the speaker unit.

4. The electronic apparatus according to claim 1, wherein
the elastic member has an appearance face, and
the appearance face of the elastic member is in flush with an outer face of the housing in a case where the elastic member is in the first position.

5. The electronic apparatus according to claim 1, wherein
a central portion of a protrusion of the elastic member is on a side of a gravity center position of the electronic apparatus in a case where the elastic member is in the second position,
the side of the gravity center position of the electronic apparatus is in a direction of the opposite end portions of the elastic member, and
the direction of the opposite end portions of the elastic member is a cylinder axial direction of the housing.

6. The electronic apparatus according to claim 5, further comprising:
a battery configured to offset the gravity center position in the direction of the opposite end portions of the elastic member; and
a part, wherein the battery is further configured to drive the part.

7. The electronic apparatus according to claim 1, wherein
the housing has a placement portion placeable on a placement place, and
the elastic member is on a side opposite to the placement portion.

8. The electronic apparatus according to claim 1, wherein
the elastic member further includes a surface portion, and
the surface portion of the elastic member includes a flexible material.

9. The electronic apparatus according to claim 1, wherein
the supporting portion has a holding portion configured to hold the second end portion of the elastic member at the second position of the elastic member.

10. An electronic apparatus, comprising:
a housing;
an elastic member, wherein
the elastic member is configured to be in a first shape, and
the elastic member is fitted in the housing with the first shape; and
a supporting portion on the housing, wherein
the supporting portion supports opposite end portions of the elastic member,
the supporting portion supports each of the opposite end portions of the elastic member for a sliding movement between a first position and a second position,
the elastic member has the first shape in the first position of the elastic member,
a distance between the opposite end portions of the elastic member in the second position of the elastic member is less than a distance between the opposite end portions of the elastic member in the first position of the elastic member,
the elastic member is elastically deformable in a second shape in the second position,
in the second shape, a specific portion of the elastic member protrudes from the housing,
the specific portion of the elastic member is between the opposite end portions of the elastic member,
the elastic member includes a first magnetic substance between the opposite end portions of the elastic member,
the supporting portion has a second magnetic substance, and
the second magnetic substance is configured to attract the first magnetic substance to a side of the housing by a magnetic force.

* * * * *